(12) United States Patent
Plante et al.

(10) Patent No.: US 11,994,034 B2
(45) Date of Patent: May 28, 2024

(54) GAS TURBINE ENGINE WITH LOW PRESSURE COMPRESSOR STAGES

(71) Applicant: PRATT & WHITNEY CANADA CORP., Longueuil (CA)

(72) Inventors: Ghislain Plante, Verdun (CA); Ian MacFarlane, Saint-Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 707 days.

(21) Appl. No.: 16/157,476

(22) Filed: Oct. 11, 2018

(65) Prior Publication Data

US 2020/0116041 A1 Apr. 16, 2020

(51) Int. Cl.

| | | |
|---|---|---|
| *F01D 17/10* | (2006.01) | |
| *F01D 21/00* | (2006.01) | |
| *F02C 3/13* | (2006.01) | |
| *F02C 3/14* | (2006.01) | |
| *F02C 6/08* | (2006.01) | |

(Continued)

(52) U.S. Cl.
CPC ......... *F01D 17/105* (2013.01); *F01D 21/006* (2013.01); *F02C 3/13* (2013.01); *F02C 3/145* (2013.01); *F02C 6/08* (2013.01); *F02C 9/18* (2013.01); *F02K 3/075* (2013.01); *F05D 2220/3217* (2013.01); *F05D 2220/3219* (2013.01); *F05D 2260/4023* (2013.01); *F05D 2260/606* (2013.01); *F05D 2260/902* (2013.01)

(58) Field of Classification Search
CPC .. F01D 17/141; F01D 21/006; F04D 27/0269; F05D 2260/606; F05D 2220/3217; F05D 2220/3219; F05D 2260/4023; F05D 2260/902; F02C 3/13; F02C 9/18; F02C 6/08; F02C 6/206; F02C 3/145; F02C 7/36; F02C 3/06; F02K 3/075
See application file for complete search history.

(56) References Cited

U.S. PATENT DOCUMENTS 5,775,092 A 7/1998 Hines
5,845,482 A 12/1998 Carscallen
(Continued)

FOREIGN PATENT DOCUMENTS

WO 2010078497 A1 7/2010
WO 2011038216 A1 3/2011

OTHER PUBLICATIONS

European Search Report received in corresponding EP application No. 19202086 dated Mar. 13, 2020.

*Primary Examiner* — Christopher Verdier
(74) *Attorney, Agent, or Firm* — NORTON ROSE FULBRIGHT CANADA LLP.

(57) ABSTRACT

A low pressure compressor section of a gas turbine engine includes low pressure compressor stages spaced apart along an axis of rotation of the low pressure compressor section. The low pressure compressor section includes at least one of a fluid conduit extending between an air inlet of the gas turbine engine and the low pressure compression stages. The fluid conduit having at least one flow diverter displaceable between a first position and a second position to modulate air through the low pressure compressor stages. And/or a compressor stage disabler is engageable with at least one of the low pressure compressor stages and configured to reduce a rotation thereof.

11 Claims, 7 Drawing Sheets

(51) Int. Cl.
  *F02C 9/18*      (2006.01)
  *F02K 3/075*     (2006.01)

(56) References Cited

U.S. PATENT DOCUMENTS

| | | | |
|---|---|---|---|
| 6,312,215 B1 * | 11/2001 | Walker | F16D 51/40 |
| | | | 415/9 |
| 10,533,559 B2 * | 1/2020 | Plante | F04D 29/582 |
| 2010/0154383 A1 | 6/2010 | Ress, Jr. | |
| 2010/0223903 A1 * | 9/2010 | Starr | F02C 9/18 |
| | | | 60/204 |
| 2011/0167792 A1 * | 7/2011 | Johnson | F02C 7/042 |
| | | | 60/226.3 |
| 2012/0272656 A1 * | 11/2012 | Norris | F02K 3/12 |
| | | | 60/772 |
| 2014/0260180 A1 * | 9/2014 | Kupratis | F02K 1/805 |
| | | | 60/226.3 |
| 2016/0025142 A1 * | 1/2016 | Wasserman | F16C 19/06 |
| | | | 384/447 |
| 2016/0084111 A1 * | 3/2016 | Bei | F01D 11/06 |
| | | | 415/111 |

\* cited by examiner

GAS TURBINE ENGINE WITH LOW PRESSURE COMPRESSOR STAGES

TECHNICAL FIELD

The application relates generally to gas turbine engines and, more particularly, to gas turbine engines with a low pressure compressor.

BACKGROUND

Some gas turbine engines have an engine architecture where a low pressure compressor and a high pressure compressor provide pressurized air to the combustor. The components of the low pressure compressor are often linked to a low pressure spool, which is typically driven by a power turbine shaft. Therefore, the pressure ratio provided by the low pressure compressor is linked to the maximum capacity of the power turbine, and is therefore fixed. The fixed pressure ratio provided by the low pressure compressor limits the operation and efficiency of the gas turbine engine through all operating conditions.

SUMMARY

In an aspect, there is provided a gas turbine engine, comprising: a low pressure compressor section in fluid communication with an air inlet and drivingly engaged by a low pressure turbine section, the low pressure compressor section having low pressure compressor stages spaced apart along an axis of rotation of the low pressure compressor section, and the low pressure compressor section having at least one of: a fluid conduit extending between the air inlet and the low pressure compression stages, the fluid conduit having at least one flow diverter displaceable between a first position and a second position to modulate air flow through the low pressure compressor stages; and a compressor stage disabler drivingly engaged with at least one of the low pressure compressor stages and configured to reduce a rotation thereof; a high pressure compressor section in fluid communication with the low pressure compressor stages to receive pressurized air therefrom and drivingly engaged by a high pressure turbine section; and an output drive shaft drivingly engaged by the low pressure turbine section.

In another aspect, there is provided a method of operating a compressor of a gas turbine engine, comprising: drawing air into a core of the gas turbine engine from an air inlet and through axially spaced-apart low pressure compressor stages, and then through a high pressure compressor section to provide pressurized air; and while drawing air into the core, at least one of: varying a flow of the air through the low pressure compressor stages; and varying an increase in pressure of the air across the low pressure compressor stages.

In another aspect, there is provided a low pressure compressor section of a gas turbine engine, comprising: low pressure compressor stages spaced apart along an axis of rotation of the low pressure compressor section, the low pressure compressor section having at least one of: a fluid conduit extending between an air inlet of the gas turbine engine and the low pressure compression stages, the fluid conduit having at least one flow diverter displaceable between a first position and a second position to modulate air flow through the low pressure compressor stages; and a compressor stage disabler drivingly engaged with at least one of the low pressure compressor stages and configured to reduce a rotation thereof.

DESCRIPTION OF THE DRAWINGS

Reference is now made to the accompanying figures in which.

DETAILED DESCRIPTION

Figure 1A:
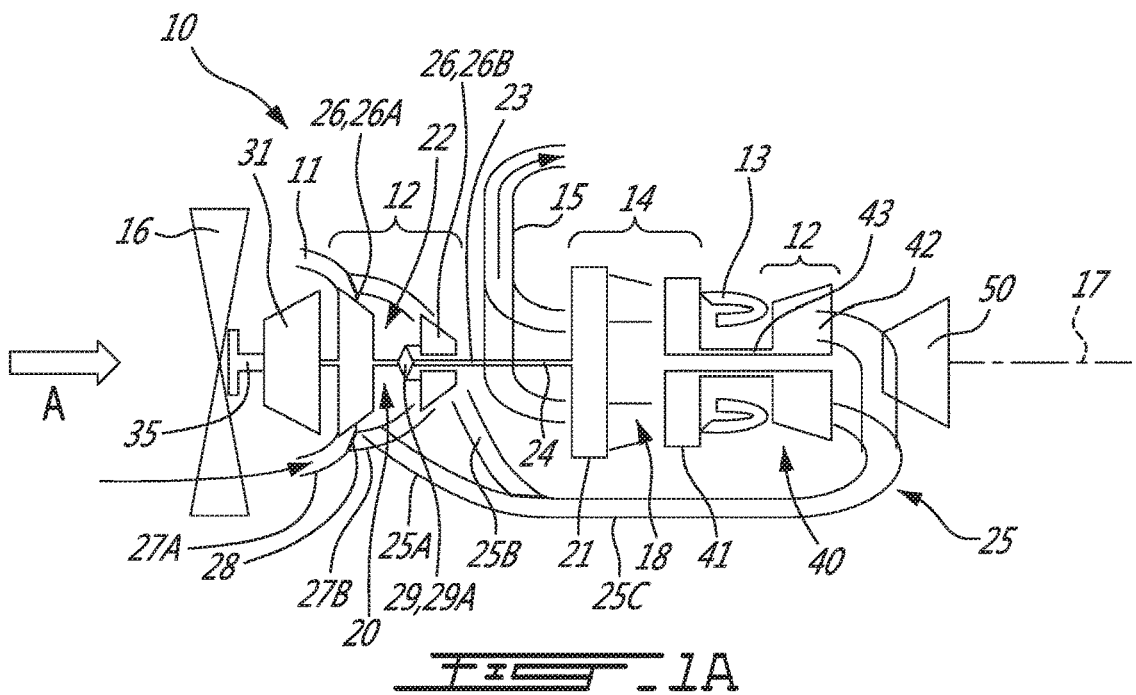
FIG. 1A is a schematic cross-sectional view of a gas turbine engine, showing a low pressure compressor section according to an embodiment of the present disclosure.

FIG. 1A illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the gas turbine engine 10. The engine 10 includes a propeller 16 which provides thrust for flight and taxiing. The gas turbine engine 10 has a longitudinal center axis 17.

The gas turbine engine 10 (sometimes referred to herein simply as "engine 10") has a central core 18 through which gases flow and which includes some of the turbomachinery of the engine 10. The engine 10 in FIG. 1A is a "reverse-flow" engine 10 because gases flow through some of the core 18 in a direction opposite to that of oncoming air flow A. This is in contrast to "through-flow" gas turbine engines, examples of which are disclosed below, in which gases flow through some or all of the core 18 of the engine from a direction parallel to that of the oncoming air flow A.

The expressions "forward" and "aft" used herein refer to the relative disposition of components of the engine 10. In the embodiment shown, a component of the engine 10 that is "forward" of another component is arranged within the engine 10 such that it is located closer to the propeller 16. Similarly, a component of the engine 10 that is "aft" of another component is arranged within the engine 10 such that it is further away from the propeller 16.

Still referring to FIG. 1A, the engine 10 has multiple spools which perform compression to pressurize the air received through the air inlet 11, and which extract energy from the combustion gases before they exit the core 18 via the exhaust outlet 15.

A first spool 20 includes at least one component to compress the air that is part of the compressor section 12, and at least one component to extract energy from the combustion gases that is part of the turbine section 14. More particularly, the first spool 20 has a low pressure turbine section 21 which extracts energy from the combustion gases, and which is drivingly engaged (e.g. directly connected) to a low pressure compressor section 22 for pressurizing the air. The low pressure turbine section 21 (sometimes referred to herein simply as "LP turbine section 21") drives the low pressure compressor section 22 (sometimes referred to herein simply as "LPC section 22") thereby causing the LPC section 22 to pressurize the air. Both the LP turbine section 21 and the LPC section 22 are disposed along a common axis of rotation, which may be parallel or collinear with the center axis 17. In the depicted embodiment, both the LP turbine section 21 and the LPC section 22 are axial rotatable components having an axis of rotation that is coaxial with the center axis 17.

In the depicted embodiment, the first spool 20 has a power shaft 23 which mechanically couples the LP turbine section 21 and the LPC section 22, and extends between them. The power shaft 23 is coaxial with the center axis 17 of the engine 10 in the embodiment of FIG. 1A, but need not be. The power shaft 23 allows the LP turbine section 21 to drive the LPC section 22 during operation of the engine 10. The power shaft 23 is not limited to the configuration depicted in FIG. 1, and can also mechanically couple the LP turbine section 21 and the LPC section 22 in any other suitable way provided that it transmits a rotational drive from the LP turbine section 21 to the LPC section 22. For example, the power shaft 23 can be combined with a geared LPC section 22 to allow the LPC section 22 to run at a different rotational speed from the LP turbine section 21. This can provide more flexibility in the selection of design points for the LPC section 22.

Still referring to FIG. 1A, the engine 10 includes an output drive shaft 24. The drive shaft 24 is drivingly engaged with the LP turbine section 21. In the depicted embodiment, the drive shaft 24 and the power shaft 23 are coaxial and interconnected.

Other mechanical techniques can also be used to interconnect the power and drive shafts 23,24. For example, the power and drive shafts 23,24 can be interconnected by curvic coupling, pins, and interference fits. Other configurations of the drive shaft 24 and the power shaft 23 are also possible. For example, the drive shaft 24 and the power shaft 23 can be a single shaft driven by the LP turbine section 21. The drive shaft 24 therefore transfers the rotational output of the LP turbine section 21 in a forward direction to drive another component.

A rotatable load, which in the embodiment shown includes the propeller 16, is mountable to the engine 10, and when mounted, is drivingly engaged (e.g. directly connected) to the LP turbine section 21, and is located forward of the LP turbine section 21. In such a configuration, during operation of the engine 10, the LP turbine section 21 drives the rotatable load such that a rotational drive produced by the LP turbine section 21 is transferred to the rotatable load. The rotatable load can therefore be any suitable component, or any combination of suitable components, that is capable of receiving the rotational drive from the LP turbine section 21.

In the embodiment shown in FIG. 1A, a reduction gearbox 31 (sometimes referred to herein simply as "RGB 31") is mechanically coupled to a front end of the drive shaft 24, which extends between the RGB 31 and the LP turbine section 21. The RGB 31 processes and outputs the rotational drive transferred thereto from the LP turbine section 21 via the drive shaft 24 through gear reduction techniques. The RGB 31 allows for the propeller 16 to be driven at its optimal rotational speed, which is different from the rotational speed of the LP turbine section 21.

The propeller 16 is mechanically coupled to the output of the RGB 31 via a propeller shaft 35. The propeller shaft 35 allows the rotational drive outputted by the RGB 31 during operation of the engine 10 to be transferred to the propeller 16 to provide propulsion during flight. In an alternate embodiment where the engine 10 is a turboshaft, the propeller 16 is omitted and the rotational load (which may include, but is not limited to, helicopter main rotor(s) and/or tail rotor(s), propeller(s) for a tilt-rotor aircraft, pump(s), generator(s), gas compressor(s), marine propeller(s), etc.) is driven by the LP turbine section 21 via the RGB 31, or the propeller 16 and RGB 31 are omitted such that the output of the engine 10 is provided by the output drive shaft 24.

Still referring to FIG. 1A, the engine 10 includes a second spool 40 with at least one component to compress the air that is part of the compressor section 12, and at least one component to extract energy from the combustion gases that is part of the turbine section 14. The second spool 40 is also disposed along the center axis 17 and includes a high pressure turbine section 41 drivingly engaged (e.g. directly connected) to a high pressure compressor section 42 by a high pressure shaft 43 rotating independently of the power shaft 23. Similarly to the LP turbine section 21 and the LPC section 22, the high pressure turbine section 41 (sometimes referred to herein simply as "HP turbine section 41") and the high pressure compressor section 42 (sometimes referred to herein simply as "HPC section 42") can include axial rotary components. During operation of the engine 10, the HP turbine section 41 drives the HPC section 42.

In FIG. 1A, the HP turbine section 41 is aft of the LP turbine section 21, and forward of the combustor 13. The HPC section 42 is aft of the combustor 13. From this arrangement of the HP turbine section 41 and the HPC section 42, it can be appreciated that during operation of the engine 10, the LPC section 22 driven by the LP turbine section 21 feeds pressurized air to the HPC section 42. Therefore, the pressurized air flow produced by the LPC section 22 is provided to the HPC section 42 and contributes to the work of both the LP turbine section 21 and the HP turbine section 41. In FIG. 1A, compressor ducting 25 extends from the outlet of the LPC section 22 to the HPC section 42, to communicate pressurized air from the LPC section 22 to the HPC section 42. The compressor ducting 25 bypasses some of the turbomachinery of the engine 10 shown in FIG. 1A, such as the LP turbine section 21, the HP turbine section 41, and the combustor 13.

The presence of the above-described first and second spools 20,40 provides the engine 10 with a "split compressor" arrangement. Other examples of engine architectures are provided in U.S. patent application Ser. No. 15/266,321 filed Sep. 15, 2016, and US patent number 10,738,709 filed Feb. 9, 2017, the entire contents of each of which are incorporated by reference herein.

The LP turbine section 21 is the "low-speed" and "low pressure" turbine section when compared to the HP turbine section 41, which is sometimes referred to as the "gas generator". The LP turbine section 21 is sometimes referred to as a "power turbine" section. The turbine rotors of the HP turbine section 41 spin at a higher rotational speed than the turbine rotors of the LP turbine section 21 given the closer proximity of the HP turbine section 41 to the outlet of the combustor 13. Consequently, the compressor rotors of the HPC section 42 may rotate at a higher rotational speed than the compressor rotors of the LPC section 22. The engine 10 shown in FIG. 1A is thus a "two-spool" engine 10.

The HP turbine section 41 and the HPC section 42 can have any suitable mechanical arrangement to achieve the above-described split compressor functionality. For example, and as shown in FIG. 1A, the second spool 40 includes a high pressure shaft 43 extending between the HPC section 42 and the HP turbine section 41. The high pressure shaft 43 is coaxial with the power shaft 23 and rotatable relative thereto. The relative rotation between the high pressure shaft 43 and the power shaft 23 allow the shafts 23,43 to rotate at different rotational speeds, thereby allowing the HPC section 42 and the LPC section 22 to rotate at different rotational speeds. The high pressure shaft 43 can be mechanically supported by the power shaft 23 using bearings or the like. In the depicted embodiment, the power shaft 23 is axially spaced apart from the high pressure shaft 43.

Still referring to the embodiment shown in FIG. 1A, the engine 10 also includes an accessory gearbox 50. The accessory gearbox 50 (sometimes referred to herein simply as "AGB 50") receives a rotational output and in turn drives accessories (e.g. fuel pump, starter-generator, oil pump, scavenge pump, etc.) that contribute to the functionality of the engine 10. The AGB 50 can be designed with side-facing accessories, top-facing accessories, or rear-facing accessories depending on the installation needs. The AGB 50 is aft of the air inlet 11. The AGB 50 can be arranged relative to the core 18 of the engine 10 differently than as described above.

Still referring to FIG. 1A, the LPC section 22 has multiple low pressure compressor stages 26. Each low pressure compressor stage 26 (sometimes referred to herein simply as "LPC stage 26") may be operated to pressurize the air drawn into the air inlet 11 and thus contributes to the overall pressure ratio of the LPC section 22. The pressurized air provided by the LPC stages 26 is communicated, via the compressor ducting 25, to the HPC section 42. In FIG. 1A, all the LPC stages 26 are rotatably driven by the power shaft 23, and thus by the LP turbine section 21, about the axis of rotation of the power shaft 23. The LPC stages 26 therefore act as superchargers because they help increase the pressure of the air supplied from the air inlet 11 and are driven by a mechanical link to the turbomachinery of the engine 10. This contrasts with a turbocharger, which is typically driven by exhaust gases from the engine.

Each LPC stage 26 includes a rotatable hub having compressor blades circumferentially spaced apart on the hub and extending radially outwardly from the hub. The compressor blades of each LPC stage 26 may be arranged in a single row, or in multiple rows of compressor blades where each row of blades is spaced apart from another row of blades along the axis of rotation of the hub. In an alternate embodiment, one or more of the LPC stages 26 includes multiple rotor hubs each having circumferentially spaced apart rotor blades, where each rotor hub in the LPC stage 26 is spaced apart from another rotor hub along the axis of rotation of the rotor hubs. Each LPC stage 26 is therefore a grouping of rotatable compressor blades separated by a fluid passage from another grouping of rotatable compressor blades. Each LPC stage 26 is associated with its own pressure ratio across the LPC stage 26.

In FIG. 1A, the LPC stages 26 include a first LPC stage 26A and a second LPC stage 26B which are spaced apart from one another along the axis of rotation of the power shaft 23 (i.e. along the center axis 17 in FIG. 1A). It will be appreciated that the LPC section 22 may have more than the two LPC stages 26A,26B shown in FIG. 1A. In FIG. 1A, the compressor ducting 25 includes a first ducting segment 25A extending from the outlet of the first LPC stage 26A to a main ducting segment 25C of the compressor ducting 25 in communication with the inlet of the HPC section 42. The compressor ducting 25 also includes a second ducting segment 25B extending from the outlet of the second LPC stage 26B to the main ducting segment 25C.

Figure 1B:
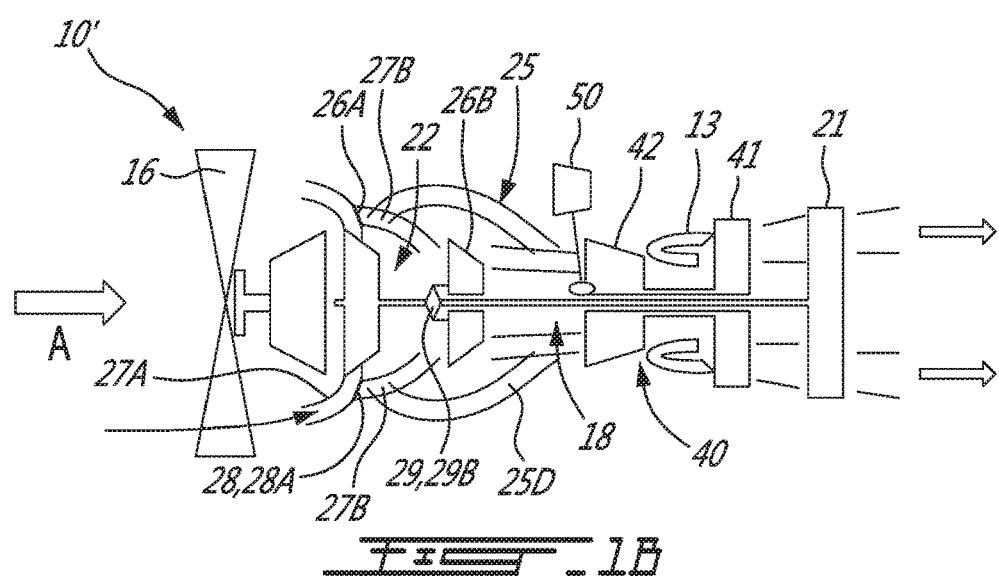
FIG. 1B is a schematic cross-sectional view of another gas turbine engine, showing a low pressure compressor section similar to that of FIG. 1A.
Figure 1C:
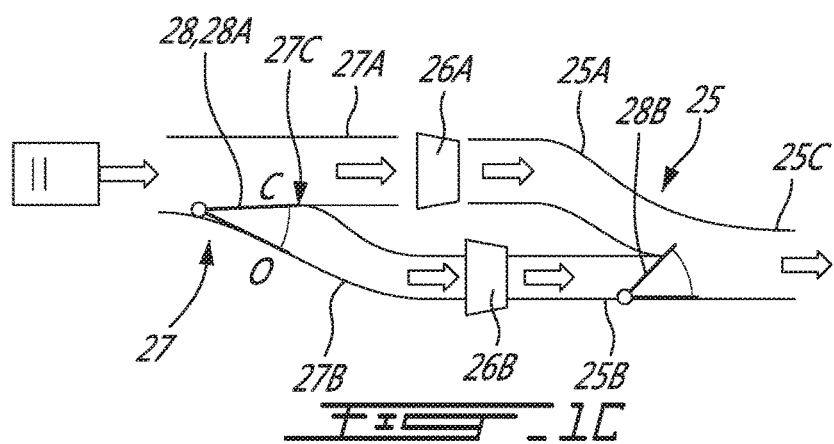
FIG. 1C is a schematic representation of the low pressure compressor sections of FIGS. 1A and 1B.

Referring to FIG. 1B, the embodiment of the engine 10' has an architecture and arrangement of turbomachinery similar to the engine 10 of FIG. 1A, where similar elements are identified by the same reference numerals and will not be described further herein. The engine 10' in FIG. 1B is a "through-flow" engine 10', in which gases flow through some or all of the core 18 of the engine along a direction parallel to that of the oncoming air flow A. The arrangement of components on the second spool 40 differs in FIG. 1B, in that the HP turbine section 41 is forward of the LP turbine section 21, and aft of the combustor 13. The HPC section 42 is forward of the combustor 13. From this arrangement of the HP turbine section 41 and the HPC section 42, it can be appreciated that during operation of the engine 10', the LPC section 22 driven by the LP turbine section 21 feeds pressurized air to the HPC section 42 via the compressor ducting 25. In FIG. 1B, the compressor ducting 25 also includes a single ducting segment 25D extending from the outlet of the first LPC stage 26A to the inlet of the HPC section 42. The single ducting segment 25D allows the pressurized air output from the first LPC stage 26A to bypass the second LPC stage 26B. The AGB 50 is side mounted in FIG. 1B.

Referring to FIGS. 1A to 10, the LPC section 22 has a fluid conduit 27 which extends between the air inlet 11 and the LPC stages 26. The fluid conduit 27 is an assembly of tubing or ducting for channeling air into the LPC stages 26, and to fluidly communicate with the compressor ducting 25 and the HPC section 42. In the depicted embodiment, the fluid conduit 27 has an annular shape defined about the center axis 17 of the engine 10,10'.

The fluid conduit 27 has multiple fluid conduit segments. The fluid conduit 27 has a first fluid conduit 27A segment extending between the air inlet 11 and the first LPC stage 26A, and a second fluid conduit segment 27B extending between the air inlet 11 and the second LPC stage 26B. The first and second fluid conduit segments 27A,27B are positioned, shaped, and configured to communicate air from the air inlet 11 to the first and second LPC stages 26A,26B, respectively. The first and second fluid conduit segments 27A,27B meet at a fluid conduit junction 27C at which both the first and second fluid conduit segments 27A,27B are capable of fluidly communicating with each other. In the depicted embodiment, each of the fluid conduit segments 27A,27B in the depicted embodiment are enclosed bodies which are fluidly separated from the annular gas path volume extending around the core 18 through which the pressurized air of the LPC stages 26 is conveyed. Stated differently, air flow through the fluid conduit segments 27A,27B does not mix with air in the annular gas path volume extending around the core 18. The fluid conduit 27 may have more than two fluid conduit segments 27A,27B.

The LPC section 22 has components which allow for varying or modulating the flow of the air provided by the LPC stages 26 to the HPC section 42. One of these components is shown in FIGS. 1A to 10. The fluid conduit 27 has one or more flow diverters 28 which are displaceable to direct air flow from the air inlet 11 to one or both of the first and second LPC stages 26A,26B. A first flow diverter 28A is displaceable between a first, open position and a second, closed position to direct air through the LPC stages 26, and thus modulate the flow of air through the LPC stages 26. In the depicted embodiment, the first flow diverter 28A is mounted about the fluid conduit junction 27C to open and close a fluid passage defined at the fluid conduit junction 27C between the first and second fluid conduit segments 27A,27B.

Referring to FIG. 10, in a closed position of the first flow diverter 28A (designated with the letter "C"), the first flow diverter 28A obstructs the fluid conduit junction 27C such that air from the air inlet 11 is substantially prevented from entering the second fluid conduit segment 27B to be communicated to the second LPC stage 26B. Therefore, substantially all of the air from the air inlet 11 is communicated only to the first fluid conduit segment 27A and to the first LPC stage 26A. In the first, open position (designated with the letter "O"), the first flow diverter 28A does not obstruct the fluid conduit junction 27C such that air from the air inlet 11 is allowed to enter both the first and the second fluid conduit segments 27A, 27B to be communicated to both the first and the second LPC stages 26A, 26B. Therefore, all of the air from the air inlet 11 is communicated to both the first and second LPC stages 26A, 26B, and they operate in "parallel".

The first flow diverter 28A in FIG. 10 therefore allows for an LPC section 22 where the inlet air flow always supplies the first LPC stage 26A, while optionally supplying the second LPC stage 26B.

Still referring to FIG. 10, a second flow diverter 28B in the compressor ducting 25 helps to control the flow of air downstream from one of the LPC stages 26. The second flow diverter 28B in the depicted embodiment is positioned to block flow in the second ducting segment 25B before it reaches the main ducting segment 25C when the second flow diverter 28B is in the second, closed position. The second flow diverter 28B in the depicted embodiment is positioned to not obstruct flow in the second ducting segment 25B such that the output of the second LPC stage 26B is able to reach the main ducting segment 25C when the second flow diverter 28B is in the open position. Each of the first and second flow diverters 28A,28B may be any suitable device, or may take any suitable form, to accomplish the functionality ascribed thereto. In an embodiment, the first and second flow diverters 28A,28B include flaps or gates mounted onto hinges. In an alternate embodiment, the first and second flow diverters 28A,28B include baffles or other flow deflector devices. The first and second flow diverters 28A,28B may also be positioned between the open and closed positions described above.

In FIG. 10, when the first and second flow diverters 28A,28B are in the open position O, it may be desirable for the first and second LPC stages 26A,26B to supply substantially the same quantity of air flow to avoid flow reversal or bad flow mixing. In such a situation, the quantity of air (e.g. mass flow) provided by each of the LPC stages 26 is substantially the same.

The LPC section 22 disclosed herein therefore allows for a variable quantity of flow to be sent to the HPC section 42 using the LPC stages 26. The flow diversion described above helps to control the flow passing through the LPC section 22 before it reaches the HPC section 42. In the depicted embodiment, the diverted flow is not bled off or sent out of the main gas path, and is instead conserved and directed to the appropriate LPC stage 26.

Figure 7:
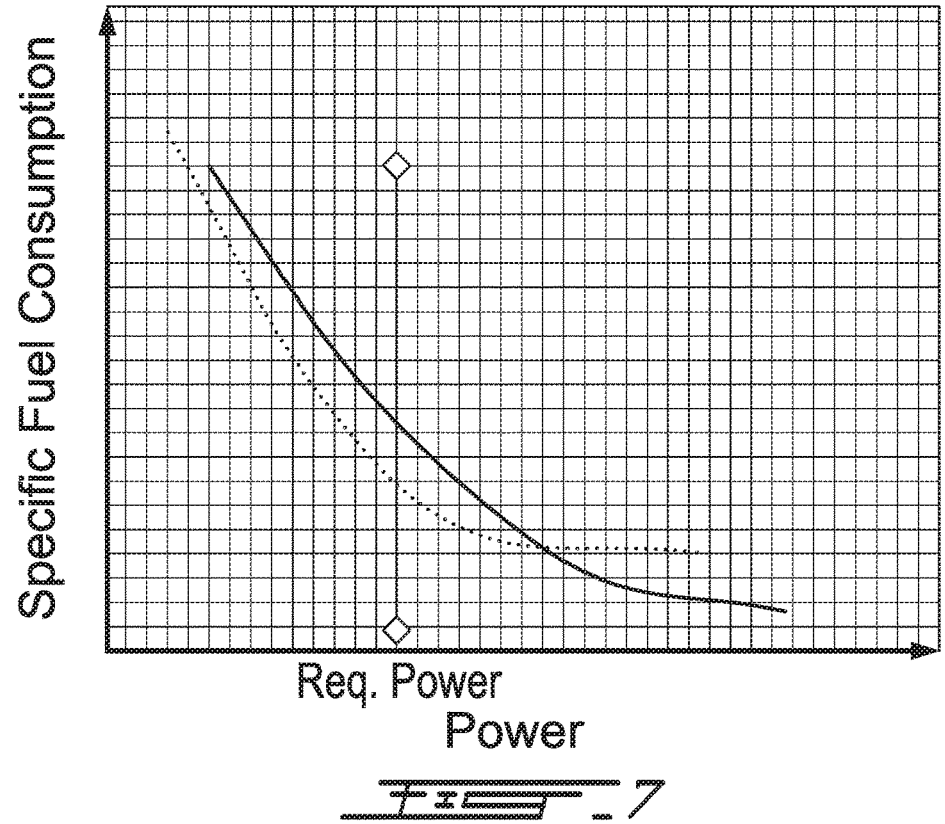
FIG. 7 is a graph plotting specific fuel consumption as a function of power.

FIG. 7 shows fuel consumption as a function of power. A first power curve shown in dotted lines is representative of air flowing through only one of the LPC stages 26, and a second power curve shown as a solid line is representative of air flowing through all of the LPC stages 26. As can be seen, the specific fuel consumption (SFC) of the first power curve is lower than the SFC of the second power curve for the required power. The LPC section 22 disclosed herein therefore helps to lower the flow through the LPC stages 26 to match a given required output power. This may help the high pressure second spool 40 to run closer to its design speed, and thus be more efficient.

The LPC section 22 also has components which allow for varying the pressure of the air provided by the LPC stages 26 to the HPC section 42. One of these components is shown in FIGS. 1A to 10. The LPC section 22 has a compressor stage disabler 29. The compressor stage disabler 29 engages one or more of the LPC stages 26 to vary a rotation of the LPC stage 26. By "vary a rotation", it is understood that the compressor stage disabler 29, when engaged with the LPC stage 26, prevents it from performing work on the air such that the LPC stage 26 does not pressurize the air. This is typically achieved by reducing or stopping the rotation of the LPC stage 26, and as will be explained in greater detail below, the compressor stage disabler 29 may achieve this functionality in different ways. The compressor stage disabler 29 therefore helps to vary the pressure provided by the LPC section 22 to the HPC section 42. The compressor stage disabler 29 does not modulate the flow of air through the LPC stages 26 in contrast to the flow diverter 28 described above, and instead modulates the pressure rise provided by the LPC stages 26. In the depicted embodiment, the flow is not bled off or sent out of the main gas path, and is instead conserved and directed to the appropriate LPC stage 26.

Referring to FIG. 1A, the compressor stage disabler 29 includes a brake 29A. The brake 29A is engageable with the second LPC stage 26B to slow or stop a rotation of the second LPC stage 26B. Flow is therefore free to pass through the second LPC stage 26B, but the second LPC stage 26B will perform no work on the flow to increase the pressure. In FIG. 1A, therefore, the brake 29A is engageable with the second LPC stage 26B to deactivate or disable the second LPC stage 26B. In FIG. 1A, the default position of the brake 29A is to be disengaged from the second LPC stage 26B, such that the power shaft 23 drives all the LPC stages 26 which are active.

Referring to FIG. 1B, the compressor stage disabler 29 includes a clutch 29B. The clutch 29B is selectively engageable with the second LPC stage 26B and with the power shaft 23. The clutch 29B is driven by the power shaft 23. When the clutch 29B is disengaged from the second LPC stage 26B, it decouples the power shaft 23 from the second LPC stage 26B, such that the power shaft 23 does not drive the second LPC stage 26B. Flow is therefore free to pass through the second LPC stage 26B, but the second LPC stage 26B will perform no work on the flow to increase the pressure. In FIG. 1B, therefore, the clutch 29B is disengageable from the second LPC stage 26B to deactivate or disable the second LPC stage 26B. In FIG. 1B, the default position of the clutch 29B is to be engaged with the second LPC stage 26B, such that the power shaft 23 drives all the LPC stages 26 which are active.

When the first and second LPC stages 26A,26B are active and performing work on the air, it may be desirable for the first and second LPC stages 26A,26B to have the same pressure ratio to avoid flow reversal or bad flow mixing. In such a situation, the pressure ratio for each of the LPC stages 26 is substantially the same.

Figure 8:
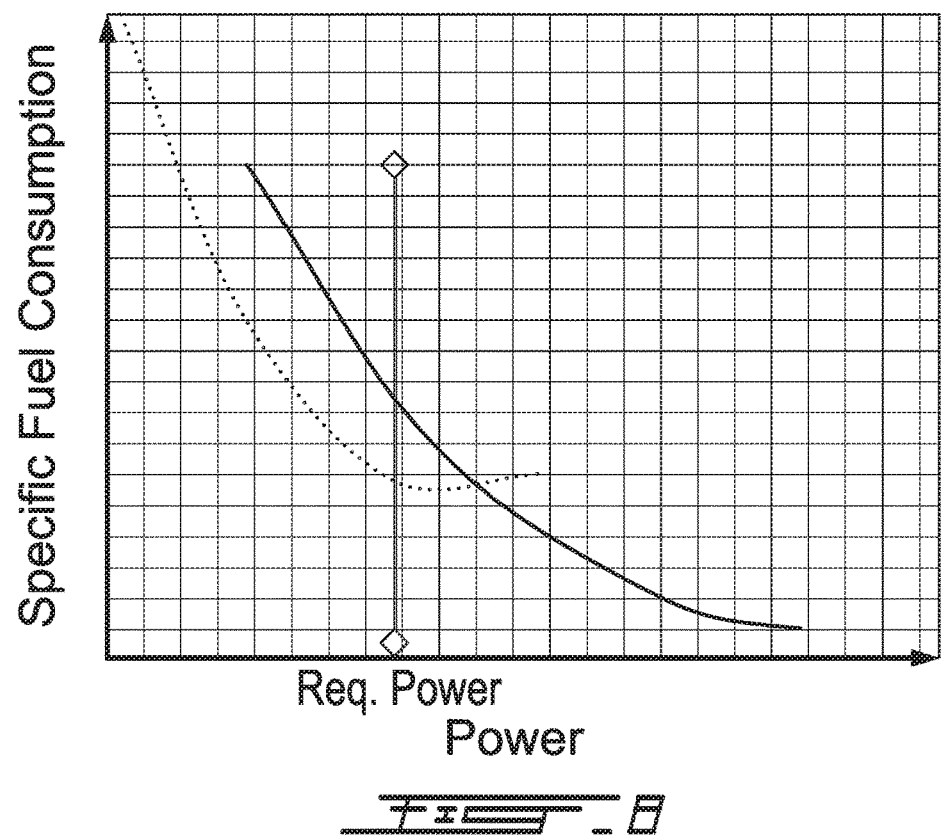
FIG. 8 is another graph plotting specific fuel consumption as a function of power.

FIG. 8 shows fuel consumption as a function of power. A first power curve shown in dotted lines is representative of air pressurized by only one of the LPC stages 26, and a second power curve shown as a solid line is representative of air pressurized by all of the LPC stages 26. As can be seen, the specific fuel consumption (SFC) of the first power curve is lower than the SFC of the second power curve for the required power. The LPC section 22 disclosed herein therefore helps to lower the overall pressure ratio across the LPC stages 26 to match a given required output power. This may help the high pressure second spool 40 to run closer to its design speed, and thus be more efficient.

It will therefore be appreciated that the LPC section 22 disclosed herein is a multi-stage low pressure compressor capable of varying the flow and/or pressure of air provided to the HPC section 42. The LPC stages 26 are linked and controllable to provide varying flow, varying pressure, or both. The LPC section 22 therefore helps to allow using a specific number of the LPC stages 26 to get a variable engine flow, and a variable overall engine pressure ratio, which can be selected depending on specific flight conditions or engine operating conditions. It will be appreciated that the LPC section 22 disclosed herein may be operated to provide both flow diversion and pressure variation, or only one of these.

Figure 2A:
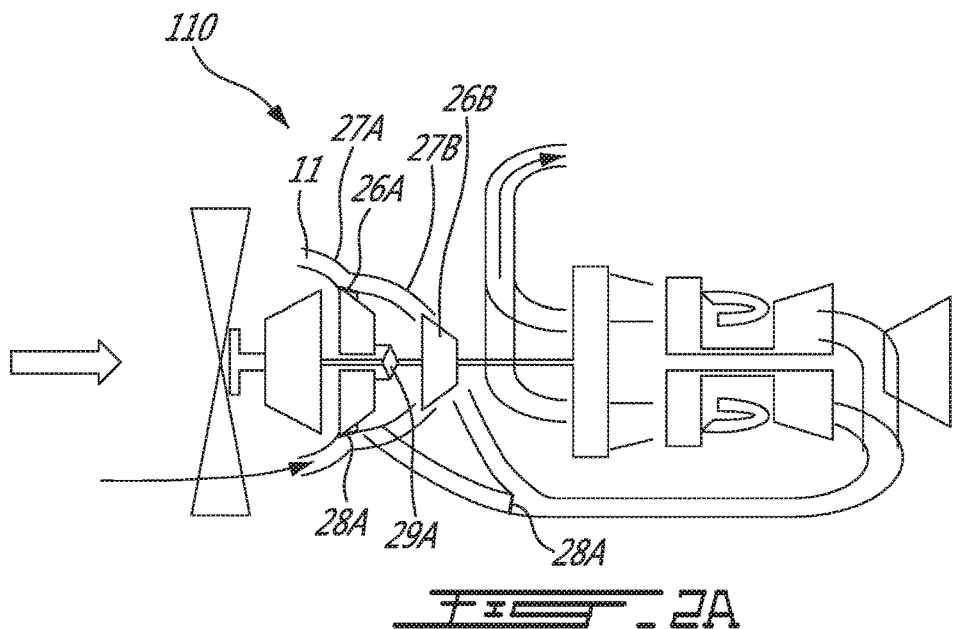
FIG. 2A is a schematic cross-sectional view a gas turbine engine, showing a low pressure compressor section according to another embodiment of the present disclosure.
Figure 2B:
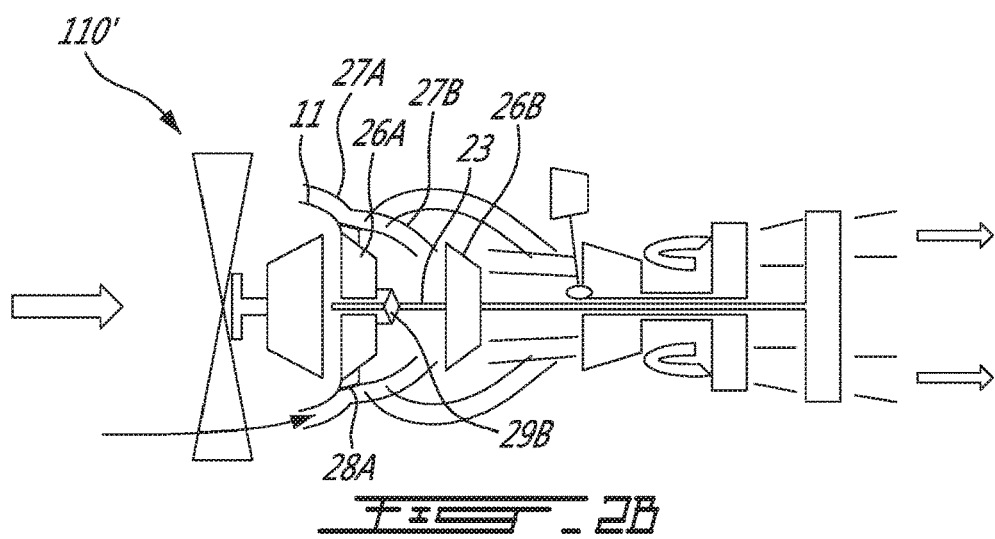
FIG. 2B is a schematic cross-sectional view of another gas turbine engine, showing a low pressure compressor section similar to that of FIG. 2A.

Referring to FIG. 2A, the embodiment of the engine 110 has an architecture and arrangement of turbomachinery similar to the "reverse-flow" engine 10 of FIG. 1A, where similar elements are identified by the same reference numerals and will not be described further herein. Some elements in FIG. 2A are not provided with reference numbers for the purposes of clarity, it being understood that these elements have the same reference numbers as the same elements shown in FIG. 1A. Referring to FIG. 2B, the embodiment of the engine 110' has an architecture and arrangement of turbomachinery similar to the "through-flow" engine 10' of FIG. 1B, where similar elements are identified by the same reference numerals and will not be described further herein. Some elements in FIG. 2B are not provided with reference numbers for the purposes of clarity, it being understood that these elements have the same reference numbers as the same elements shown in FIG. 1B. Furthermore, the above description of the components of the engines 10,10' and their associated functionality and advantages applies mutatis mutandis to the engines 110,110'.

Figure 2C:
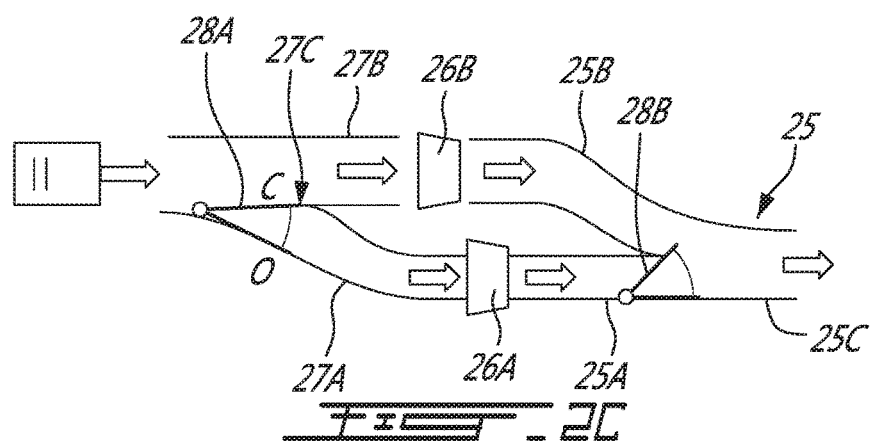
FIG. 2C is a schematic representation of the low pressure compressor sections of FIGS. 2A and 2B.

Referring to FIG. 2C, in a closed position of the first flow diverter 28A (designated with the letter "C"), the first flow diverter 28A obstructs the fluid conduit junction 27C such that air from the air inlet 11 is substantially prevented from entering the first fluid conduit segment 27A to be communicated to the first LPC stage 26A. Therefore, substantially all of the air from the air inlet 11 is communicated only to the second fluid conduit segment 27B and to the second LPC stage 26B. In the open position (designated with the letter "O"), the first flow diverter 28A does not obstruct the fluid conduit junction 27C such that air from the air inlet 11 is allowed to enter both the first and the second fluid conduit segments 27A, 27B to be communicated to both the first and the second LPC stages 26A, 26B. Therefore, all of the air from the air inlet 11 is communicated to both the first and second LPC stages 26A, 26B when the first flow diverter 28A is open, and they operate in "parallel". The first flow diverter 28A in FIG. 2C therefore allows for an LPC section 22 where the inlet air flow always supplies the second LPC stage 26B, while optionally supplying the first LPC stage 26A.

Still referring to FIG. 2C, a second flow diverter 28B in the compressor ducting 25 helps to control the flow of air downstream from one of the LPC stages 26. The second flow diverter 28B in the depicted embodiment is positioned to block flow in the first ducting segment 25A before it reaches the main ducting segment 25C when the second flow diverter 28B is in the closed position. The second flow diverter 28B in the depicted embodiment is positioned to not obstruct flow in the first ducting segment 25A such that the output of the first LPC stage 26A is able to reach the main ducting segment 25C when the second flow diverter 28B is in the open position.

Referring to FIG. 2A, the brake 29A is engageable with the first LPC stage 26A to slow or stop a rotation of the first LPC stage 26A. Flow is therefore free to pass through the first LPC stage 26A, but the first LPC stage 26A will perform no work on the flow to increase the pressure. In FIG. 2A, therefore, the brake 29A is engageable with the first LPC stage 26A to deactivate or disable the first LPC stage 26A. In FIG. 2A, the default position of the brake 29A is to be disengaged from the first LPC stage 26A, such that the power shaft 23 drives all the LPC stages 26 which are active.

Referring to FIG. 2B, the clutch 29B is selectively engageable with the first LPC stage 26A and with the power shaft 23. When the clutch 29B is disengaged from the first LPC stage 26A, it decouples the power shaft 23 from the first LPC stage 26A, such that the power shaft 23 does not drive the first LPC stage 26A. Flow is therefore free to pass through the first LPC stage 26A, but the first LPC stage 26A will perform no work on the flow to increase the pressure. In FIG. 2B, therefore, the clutch 29B is disengageable from the first LPC stage 26A to deactivate or disable the first LPC stage 26A. In FIG. 2B, the default position of the clutch 29B is to be engaged with the first LPC stage 26A, such that the power shaft 23 drives all the LPC stages 26 which are active.

Figure 3A:
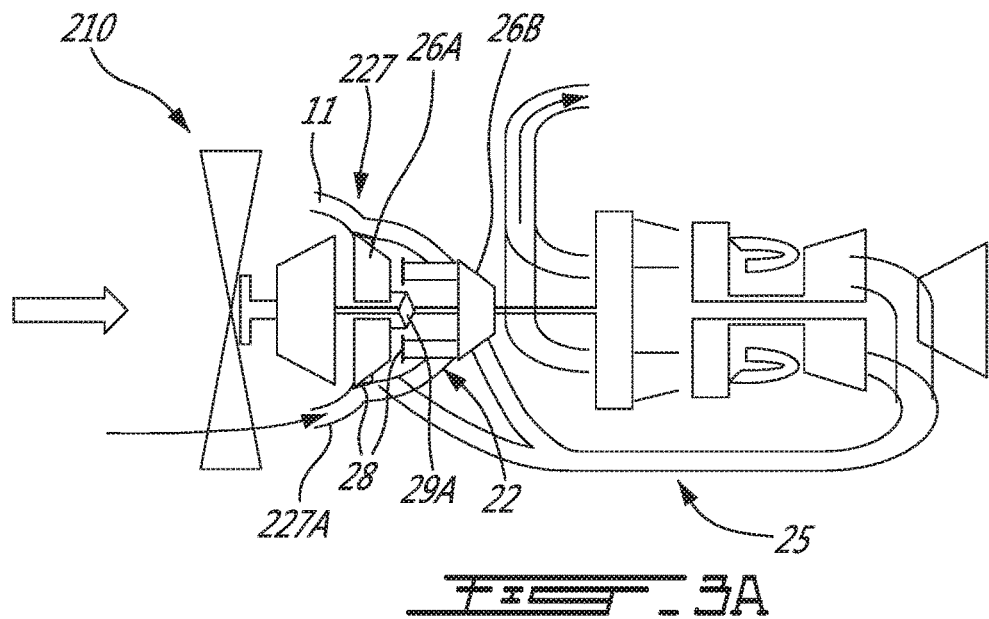
FIG. 3A is a schematic cross-sectional view a gas turbine engine, showing a low pressure compressor section according to another embodiment of the present disclosure.
Figure 3B:
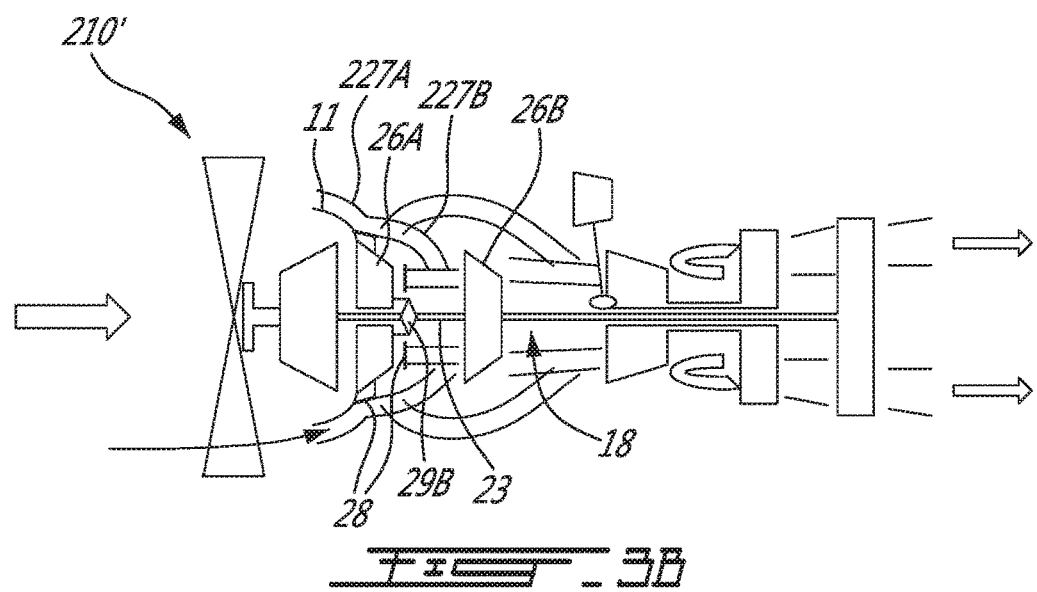
FIG. 3B is a schematic cross-sectional view of another gas turbine engine, showing a low pressure compressor section similar to that of FIG. 3A.

Referring to FIG. 3A, the embodiment of the engine 210 has an architecture and arrangement of turbomachinery similar to the "reverse-flow" engine 10 of FIG. 1A, where similar elements are identified by the same reference numerals and will not be described further herein. Some elements in FIG. 3A are not provided with reference numbers for the purposes of clarity, it being understood that these elements have the same reference numbers as the same elements shown in FIG. 1A. Referring to FIG. 3B, the embodiment of the engine 210' has an architecture and arrangement of turbomachinery similar to the "through-flow" engine 10' of FIG. 1B, where similar elements are identified by the same reference numerals and will not be described further herein. Some elements in FIG. 3B are not provided with reference numbers for the purposes of clarity, it being understood that these elements have the same reference numbers as the same elements shown in FIG. 1B. Furthermore, the above description of the components of the engines 10,10' and their associated functionality and advantages applies mutatis mutandis to the engines 210,210'.

The fluid conduit 227 in FIGS. 3A and 3B has a first fluid conduit 227A segment extending between the air inlet 11 and the first LPC stage 26A, and a second fluid conduit segment 227B extending between the air inlet 11 and the second LPC stage 26B. The second fluid conduit segment 227B bypasses the first LPC stage 26A so as to divert air from the air inlet 11 to the second LPC stage 26B. The first and second fluid conduit segments 227A,227B are positioned, shaped, and configured to communicate air from the air inlet 11 to the first and second LPC stages 26A,26B, respectively. The first and second fluid conduit segments 227A,227B meet at a fluid conduit junction 227C at which both the first and second fluid conduit segments 227A,227B are capable of fluidly communicating with each other. In the depicted embodiment, each of the fluid conduit segments 227A,227B are enclosed bodies which are fluidly separated from the annular gas path volume extending around the core 18 through which the pressurized air of the LPC stages 26 is conveyed. Stated differently, air flow through the fluid conduit segments 227A,227B does not mix with air in the annular gas path volume extending around the core 18. The fluid conduit 227 may have more than two fluid conduit segments 227A,227B.

Figure 3C:
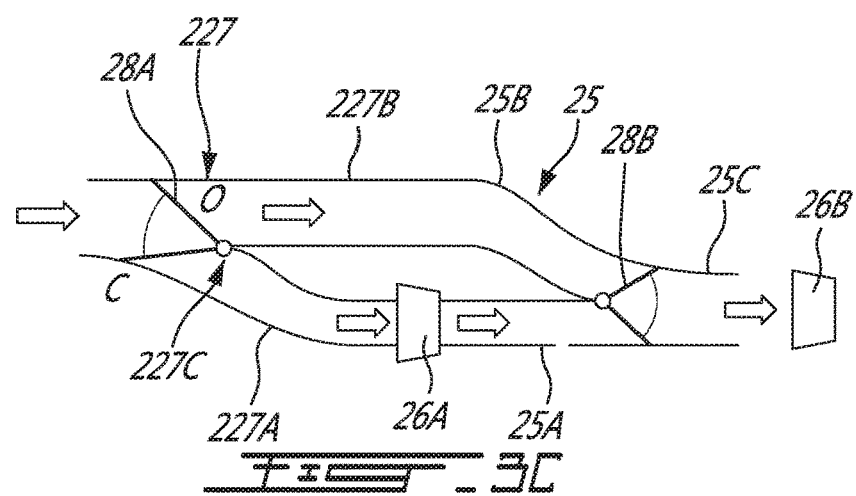
FIG. 3C is a schematic representation of the low pressure compressor sections of FIGS. 3A and 3B.

Referring to FIG. 3C, in a closed or bypass position of the first flow diverter 28A (designated with the letter "C"), the first flow diverter 28A obstructs the fluid conduit junction 227C such that air from the air inlet 11 is substantially prevented from entering the first fluid conduit segment 227A to be communicated to the first LPC stage 26A. Therefore, substantially all of the air from the air inlet 11 is communicated only to the second fluid conduit segment 227B and to the second LPC stage 26B. In the depicted embodiment, the air from the air inlet 11 is able to bypass the first LPC stage 26A when the first flow diverter 28A is in the closed position C. In the open or flow-through position (designated with the letter "O"), the first flow diverter 28A obstructs the fluid conduit junction 227C such that air from the air inlet 11 is substantially prevented from entering the second fluid conduit segment 227B to be communicated to the second LPC stage 26B. Therefore, substantially all of the air from the air inlet 11 is communicated first to the first fluid conduit segment 227A and to the first LPC stage 26A, and then subsequently from the first LPC stage 26A to the second LPC stage 26B. Therefore, when the first flow diverter 28A is in the open position O, the first and second LPC stages 26A,26B are capable of operating in "series". The first flow diverter 28A in FIG. 3C therefore allows for an LPC section 22 where the inlet air flow always supplies the second LPC stage 26B after supplying the first LPC stage 26A, or optionally supplying only the second LPC stage 26B. In the depicted embodiment, the second LPC stage 26B is configured to receive pressurized air from the upstream first LPC stage 26A.

Still referring to FIG. 3C, a second flow diverter 28B in the compressor ducting 25 helps to control the flow of air downstream from one of the LPC stages 26. The second flow diverter 28B in the depicted embodiment is positioned to block flow in the first ducting segment 25A before it reaches the main ducting segment 25C when the second flow diverter 28B is in a first position. The second flow diverter 28B in the depicted embodiment is positioned to block flow in the second ducting segment 25B before it reaches the main ducting segment 25C when the second flow diverter 28B is in a second position.

Referring to FIG. 3A, the brake 29A is engageable with the first LPC stage 26A to slow or stop a rotation of the first LPC stage 26A. Flow is therefore free to pass through the first LPC stage 26A, but the first LPC stage 26A will perform no work on the flow to increase the pressure. In FIG. 3A, therefore, the brake 29A is engageable with the first LPC stage 26A to deactivate or disable the first LPC stage 26A.

Referring to FIG. 3B, the clutch 29B is selectively engageable with the first LPC stage 26A and with the power shaft 23. When the clutch 29B is disengaged from the first LPC stage 26A, it decouples the power shaft 23 from the first LPC stage 26A, such that the power shaft 23 does not drive the first LPC stage 26A. Flow is therefore free to pass through the first LPC stage 26A, but the first LPC stage 26A will perform no work on the flow to increase the pressure. In FIG. 3B, therefore, the clutch 29B is disengageable from the first LPC stage 26A to deactivate or disable the first LPC stage 26A.

Figure 4A:
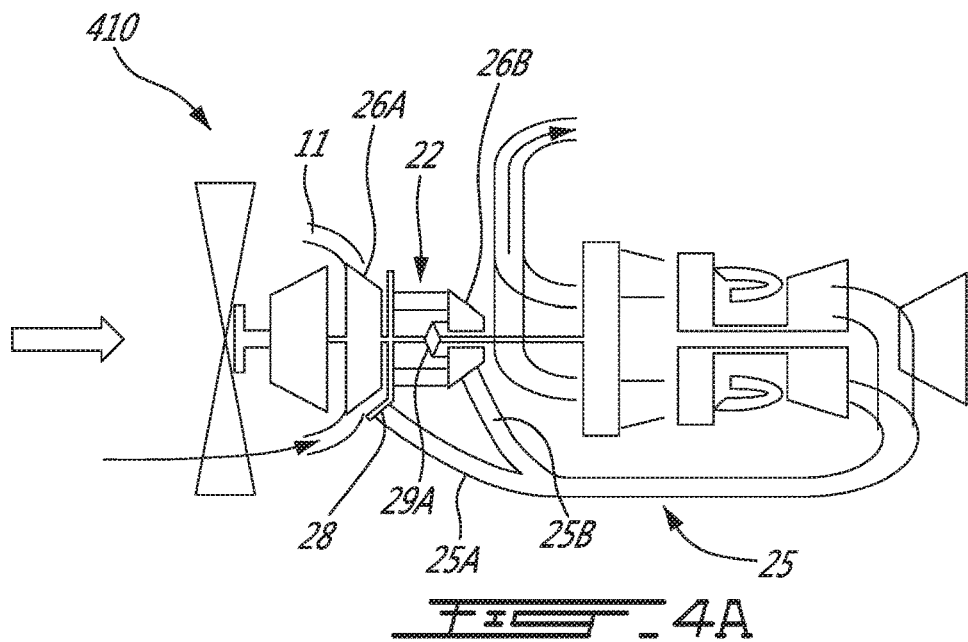
FIG. 4A is a schematic cross-sectional view a gas turbine engine, showing a low pressure compressor section according to another embodiment of the present disclosure.
Figure 4B:
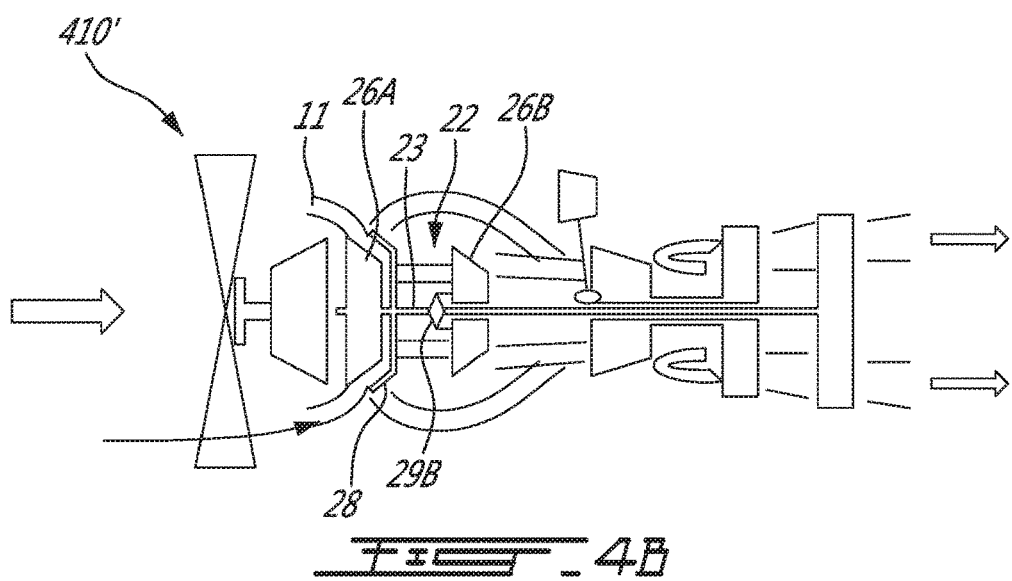
FIG. 4B is a schematic cross-sectional view of another gas turbine engine, showing a low pressure compressor section similar to that of FIG. 4A.

Referring to FIG. 4A, the embodiment of the engine 410 has an architecture and arrangement of turbomachinery similar to the "reverse-flow" engine 210 of FIG. 3A, where similar elements are identified by the same reference numerals and will not be described further herein. Some elements in FIG. 4A are not provided with reference numbers for the purposes of clarity, it being understood that these elements have the same reference numbers as the same elements shown in FIG. 3A. Referring to FIG. 4B, the embodiment of the engine 410' has an architecture and arrangement of turbomachinery similar to the "through-flow" engine 210' of FIG. 3B, where similar elements are identified by the same reference numerals and will not be described further herein. Some elements in FIG. 4B are not provided with reference numbers for the purposes of clarity, it being understood that these elements have the same reference numbers as the same elements shown in FIG. 3B. Furthermore, the above description of the components of the engines 10,10',210,210' and their associated functionality and advantages applies mutatis mutandis to the engines 410,410'.

Figure 4C:
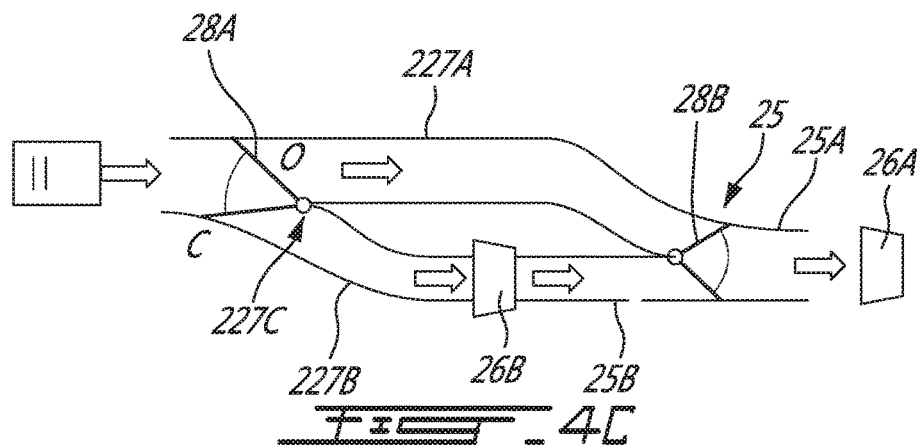
FIG. 4C is a schematic representation of the low pressure compressor sections of FIGS. 4A and 4B.

Referring to FIG. 4C, in a closed or bypass position of the first flow diverter 28A (designated with the letter "C"), the first flow diverter 28A obstructs the fluid conduit junction 227C such that air from the air inlet 11 is substantially prevented from entering the second fluid conduit segment 227B to be communicated to the second LPC stage 26B. Therefore, substantially all of the air from the air inlet 11 is communicated only to the first fluid conduit segment 227A and to the first LPC stage 26A. In the depicted embodiment, the air from the air inlet 11 is able to bypass the second LPC stage 26B when the first flow diverter 28A is in the bypass position C. In the open or flow-through position (designated with the letter "O"), the first flow diverter 28A obstructs the fluid conduit junction 227C such that air from the air inlet 11 is substantially prevented from entering the first fluid conduit segment 227A to be communicated to the first LPC stage 26A. Therefore, substantially all of the air from the air inlet 11 is communicated first to the second fluid conduit segment 227B and to the second LPC stage 26B, and then subsequently from the second LPC stage 26B to the first LPC stage 26A. Therefore, when the first flow diverter 28A is in the open or flow-through position O, the first and second LPC stages 26A,26B are capable of operating in "series". The first flow diverter 28A in FIG. 4C therefore allows for an LPC section 22 where the inlet air flow supplies the first LPC stage 26A after supplying the second LPC stage 26B, or optionally supplying only the first LPC stage 26A. In the depicted embodiment, the first LPC stage 26A is configured to receive pressurized air from the upstream second LPC stage 26B.

Still referring to FIG. 4C, a second flow diverter 28B in the compressor ducting 25 helps to control the flow of air downstream from one of the LPC stages 26. The second flow diverter 28B in the depicted embodiment is positioned to block flow in the first ducting segment 25A before it reaches the main ducting segment 25C when the second flow diverter 28B is in a first position. The second flow diverter 28B in the depicted embodiment is positioned to block flow in the second ducting segment 25B before it reaches the main ducting segment 25C when the second flow diverter 28B is in a second position.

Referring to FIG. 4A, the brake 29A is engageable with the second LPC stage 26B to slow or stop a rotation of the second LPC stage 26B. Flow is therefore free to pass through the second LPC stage 26B, but the second LPC stage 26B will perform no work on the flow to increase the pressure. In FIG. 4A, therefore, the brake 29A is engageable with the second LPC stage 26B to deactivate or disable the second LPC stage 26B.

Referring to FIG. 4B, the clutch 29B is selectively engageable with the second LPC stage 26B and with the power shaft 23. When the clutch 29B is disengaged from the second LPC stage 26B, it decouples the power shaft 23 from the second LPC stage 26B, such that the power shaft 23 does not drive the second LPC stage 26B. Flow is therefore free to pass through the second LPC stage 26B, but the second LPC stage 26B will perform no work on the flow to increase the pressure. In FIG. 4B, therefore, the clutch 29B is disengageable from the second LPC stage 26B to deactivate or disable the second LPC stage 26B.

Figure 5A:
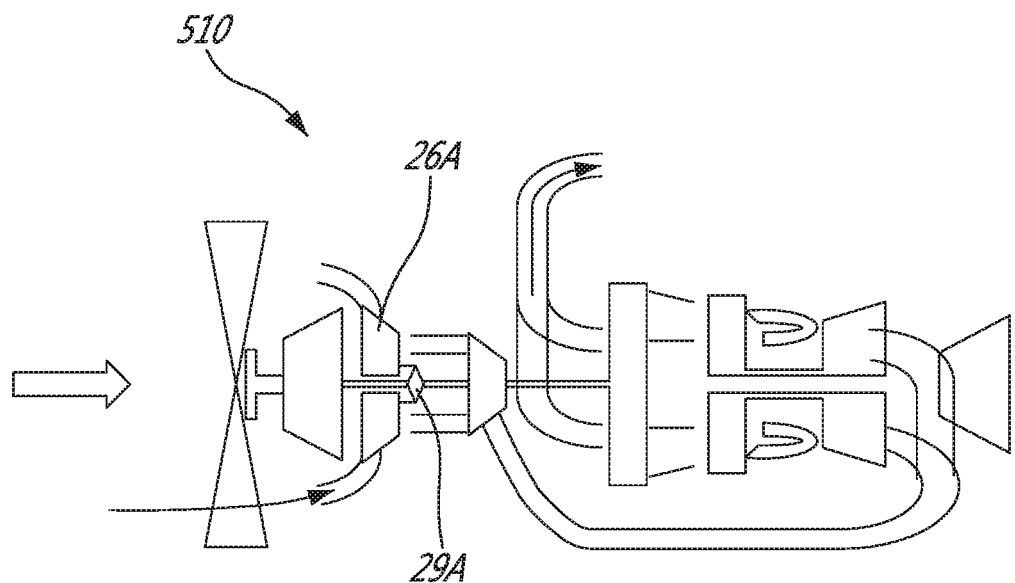
FIG. 5A is a schematic cross-sectional view a gas turbine engine, showing a low pressure compressor section according to another embodiment of the present disclosure.
Figure 5B:
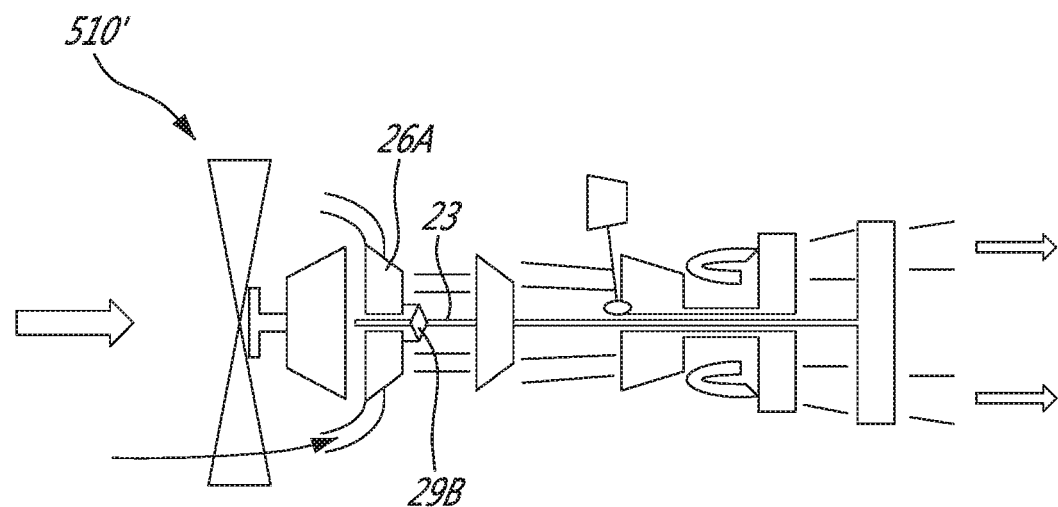
FIG. 5B is a schematic cross-sectional view of another gas turbine engine, showing a low pressure compressor section similar to that of FIG. 5A.

Referring to FIG. 5A, the embodiment of the engine 510 has an architecture and arrangement of turbomachinery similar to the "reverse-flow" engine 210 of FIG. 3A, where similar elements are identified by the same reference numerals and will not be described further herein. Some elements in FIG. 5A are not provided with reference numbers for the purposes of clarity, it being understood that these elements have the same reference numbers as the same elements shown in FIG. 3A. Referring to FIG. 5B, the embodiment of the engine 510' has an architecture and arrangement of turbomachinery similar to the "through-flow" engine 210' of FIG. 3B, where similar elements are identified by the same reference numerals and will not be described further herein. Some elements in FIG. 5B are not provided with reference numbers for the purposes of clarity, it being understood that these elements have the same reference numbers as the same elements shown in FIG. 3B. Furthermore, the above description of the components of the engines 10,10',210,210' and their associated functionality and advantages applies mutatis mutandis to the engines 510,510'.

Referring to FIG. 5A, the brake 29A is engageable with the first LPC stage 26A to slow or stop a rotation of the first LPC stage 26A. Flow is therefore free to pass through the first LPC stage 26A, but the first LPC stage 26A will perform no work on the flow to increase the pressure. In FIG. 5A, therefore, the brake 29A is engageable with the first LPC stage 26A to deactivate or disable the first LPC stage 26A.

Referring to FIG. 5B, the clutch 29B is selectively engageable with the first LPC stage 26A and with the power shaft 23. When the clutch 29B is disengaged from the first LPC stage 26A, it decouples the power shaft 23 from the first LPC stage 26A, such that the power shaft 23 does not drive the first LPC stage 26A. Flow is therefore free to pass through the first LPC stage 26A, but the first LPC stage 26A will perform no work on the flow to increase the pressure. In FIG. 5B, therefore, the clutch 29B is disengageable from the first LPC stage 26A to deactivate or disable the first LPC stage 26A. In the embodiments shown in FIGS. 5A and 5B, the engine 510,510' is free of flow diversion, and thus has a constant quantity of air which reaches the HPC section 42.

Figure 6A:
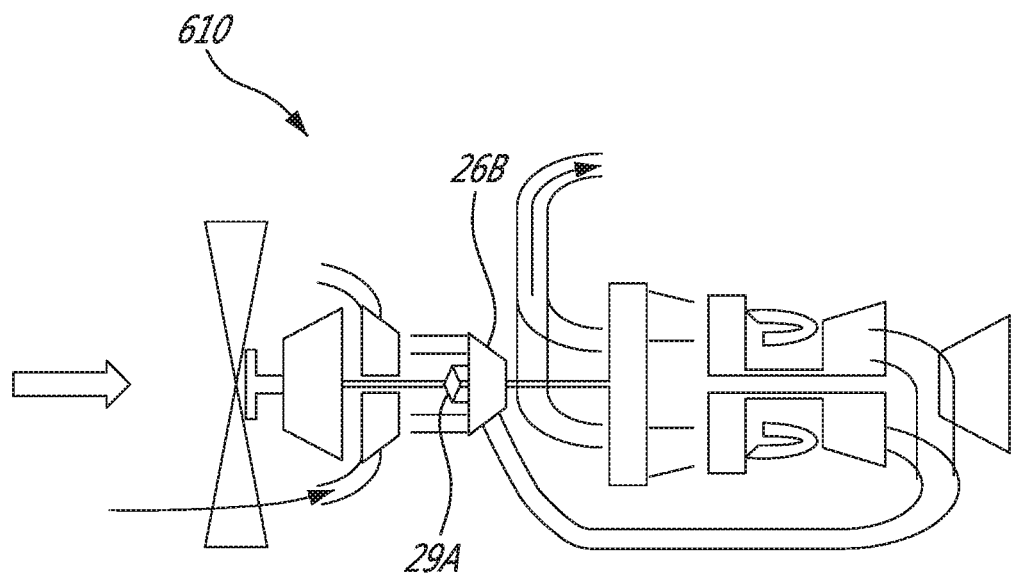
FIG. 6A is a schematic cross-sectional view a gas turbine engine, showing a low pressure compressor section according to another embodiment of the present disclosure.
Figure 6B:
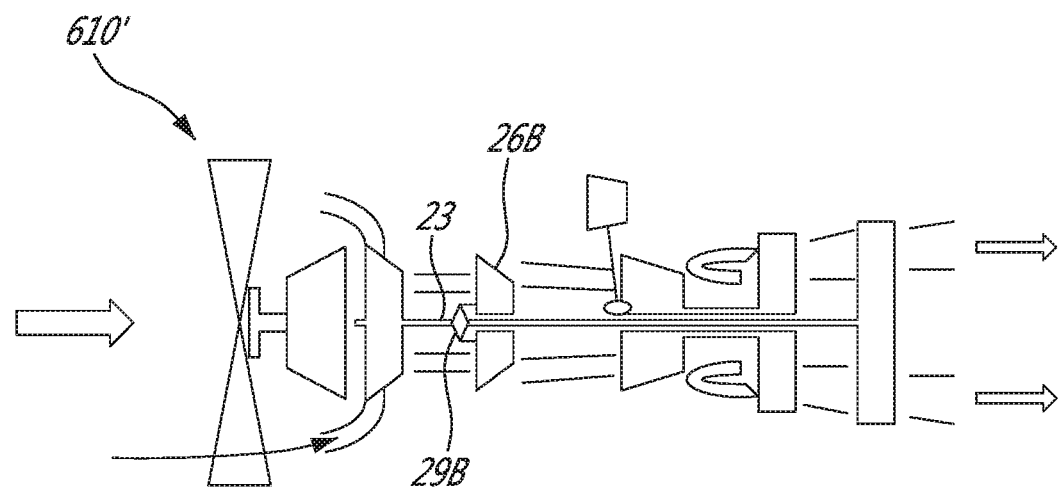
FIG. 6B is a schematic cross-sectional view of another gas turbine engine, showing a low pressure compressor section similar to that of FIG. 5A.

Referring to FIG. 6A, the embodiment of the engine 610 has an architecture and arrangement of turbomachinery similar to the "reverse-flow" engine 210 of FIG. 3A, where similar elements are identified by the same reference numerals and will not be described further herein. Some elements in FIG. 6A are not provided with reference numbers for the purposes of clarity, it being understood that these elements have the same reference numbers as the same elements shown in FIG. 3A. Referring to FIG. 6B, the embodiment of the engine 610' has an architecture and arrangement of turbomachinery similar to the "through-flow" engine 210' of FIG. 3B, where similar elements are identified by the same reference numerals and will not be described further herein. Some elements in FIG. 6B are not provided with reference numbers for the purposes of clarity, it being understood that these elements have the same reference numbers as the same elements shown in FIG. 3B. Furthermore, the above description of the components of the engines 10,10',210,210' and their associated functionality and advantages applies mutatis mutandis to the engines 610,610'.

Referring to FIG. 6A, the brake 29A is engageable with the second LPC stage 26B to slow or stop a rotation of the second LPC stage 26B. Flow is therefore free to pass through the second LPC stage 26B, but the second LPC stage 26B will perform no work on the flow to increase the pressure. In FIG. 6A, therefore, the brake 29A is engageable with the second LPC stage 26B to deactivate or disable the second LPC stage 26B.

Referring to FIG. 6B, the clutch 29B is selectively engageable with the second LPC stage 26B and with the power shaft 23. When the clutch 29B is disengaged from the second LPC stage 26B, it decouples the power shaft 23 from the second LPC stage 26B, such that the power shaft 23 does not drive the second LPC stage 26B. Flow is therefore free to pass through the second LPC stage 26B, but the second LPC stage 26B will perform no work on the flow to increase the pressure. In FIG. 6B, therefore, the clutch 29B is disengageable from the second LPC stage 26B to deactivate or disable the second LPC stage 26B. In the embodiments shown in FIGS. 6A and 6B, the engine 610,610' is free of flow diversion, and thus has a constant quantity of air which reaches the HPC section 42.

Referring to FIGS. 1A to 10, there is also disclosed a method of operating the compressor section 12. The method includes drawing air into the core 18 from the air inlet 11, through the LPC stages 26, and then through the HPC section 42 to provide pressurized air. The method includes, while drawing air into the core 18, at least one of: varying a flow of the air through the LPC stages 26, and varying an increase in pressure of the air across the LPC stages 26. In an embodiment, the flow or air or the pressure is varied based on an operating condition of the engine 10. For example, the clutch 29B may be activated or deactivated based on a flight regime in order to get more or less flow from the LPC section 22. Similarly, depending on the flight regime, the clutch 29B and the flow diverters 28 may be activated or not in order to get more mass flow from the LPC section 22, so as to have a higher pressure or a lower pressure LPC section 22.

It may be possible to select a specific engine flow condition as a function of specific flight conditions by using the LPC section 22 disclosed herein. This may help to decouple the pressure provided by the LPC section 22 from the power of LP turbine section 21.

The above description is meant to be exemplary only, and one skilled in the art will recognize that changes may be made to the embodiments described without departing from the scope of the invention disclosed. For example, although some of the embodiments of the LPC section 22 are shown having both the fluid conduit 27 and the compressor stage disabler 29, it will be appreciated that the LPC section 22 disclosed herein may have only the fluid conduit 27, or only the compressor stage disabler 29. Still other modifications which fall within the scope of the present invention will be apparent to those skilled in the art, in light of a review of this disclosure, and such modifications are intended to fall within the appended claims.

The invention claimed is:

1. A gas turbine engine, comprising:
   a low pressure compressor section in fluid communication with an air inlet and drivingly engaged by a low pressure turbine section, the low pressure compressor section having low pressure compressor stages spaced apart along an axis of rotation of the low pressure compressor section, the low pressure compressor stages including a first low pressure compressor stage and a second low pressure compressor stage, and the low pressure compressor section further having:
   a) a fluid conduit extending between the air inlet and the low pressure compressor stages, the fluid conduit having at least one flow diverter displaceable between a first position and a second position to modulate air flow through the low pressure compressor stages, the fluid conduit including a first fluid conduit segment extending between the air inlet and the first low pressure compressor stage, and a second fluid conduit segment extending between the air inlet and the second low pressure compressor stage, the first and second low pressure compressor stages fluidly connected in parallel to the air inlet via the first and second fluid conduit segments, the first and second fluid conduit segments meeting at a fluid conduit junction upstream of the low pressure compressor stages, the at least one flow diverter positioned at the fluid conduit junction and displaceable between the first position to direct air in parallel from the fluid conduit junction to both the first and second fluid conduit segments, and the second position closing the fluid conduit junction to direct air from the fluid conduit junction only to the first fluid conduit segment; and
   b) a brake selectively engageable with at least one of the first and second low pressure compressor stages and configured to reduce a rotation thereof;
   a high pressure compressor section in fluid communication with the low pressure compressor stages to receive pressurized air therefrom and drivingly engaged by a high pressure turbine section; and
   an output drive shaft drivingly engaged by the low pressure turbine section.

2. The gas turbine engine as defined in claim 1, wherein each of the low pressure compressor stages defines a pressure ratio across said low pressure compressor stages, the pressure ratio for each of the low pressure compressor stages being the same.

3. The gas turbine engine as defined in claim 1, wherein each of the low pressure compressor stages is configured to draw a quantity of air from the air inlet, the quantity of air for each of the low pressure compressor stages being the same.

4. The gas turbine engine as defined in claim 1, wherein upon the brake being disengaged from the at least one of the low pressure compressor stages, the output drive shaft drivingly engages all the low pressure compressor stages.

5. The gas turbine engine as defined in claim 1, wherein the brake is engageable with the at least one of the low pressure compressor stages to stop a rotation of the at least one of the low pressure compressor stages.

6. A method of operating a compressor of a gas turbine engine, comprising:
   drawing air into a core of the gas turbine engine from an air inlet and through axially spaced-apart low pressure compressor stages, and then through a high pressure compressor section to provide pressurized air; and
   while drawing air into the core:
      varying a flow of the air through a fluid conduit junction upstream of the low pressure compressor stages, wherein the fluid conduit junction is provided between a first fluid conduit segment and a second conduit segment of a fluid conduit, the first fluid conduit segment extending between the air inlet and one of the low pressure compressor stages, the second fluid conduit segment extending between the air inlet and another one of the low pressure compress stages, the fluid conduit having a flow diverter positioned at the fluid conduit junction, and wherein varying the flow of the air comprises displacing the flow diverter between a first position to direct air from the fluid conduit junction to both the first and second fluid conduit segments, and a second position closing the fluid conduit junction to direct air from the fluid conduit junction only to the first fluid conduit segment; and
      varying an increase in pressure of the air across the low pressure compressor stages.

7. The method as defined in claim 6, wherein providing the air drawn into the core from the air inlet to all of the low pressure compressor stages includes providing a same quantity of air to all of the low pressure compressor stages.

8. The method as defined in claim 6, wherein providing the air drawn into the core from the air inlet to all of the low pressure compressor stages includes operating the low pressure compressor stages to have a same pressure ratio.

9. The method as defined in claim 6, wherein varying the increase in pressure of the air across the low pressure compressor stages includes braking one of the low pressure compressor stages.

10. A low pressure compressor section of a gas turbine engine, comprising: low pressure compressor stages spaced apart along an axis of rotation of the low pressure compressor section, the low pressure compressor section having:
   a fluid conduit extending between an air inlet of the gas turbine engine and the low pressure compressor stages, the fluid conduit having at least one flow diverter displaceable between a first position and a second position to modulate air flow through the low pressure compressor stages, the fluid conduit including a first fluid conduit segment extending between the air inlet and one of the low pressure compressor stages, and a second fluid conduit segment extending between the air inlet and another one of the low pressure compressor stages, the first and second fluid conduit segments meeting at a fluid conduit junction upstream of the low pressure compressor stages, the at least one flow diverter positioned at the fluid conduit junction and displaceable between the first position to direct air from the fluid conduit junction to both the first and second fluid conduit segments, and the second position closing the fluid conduit junction to direct air from the fluid conduit junction only to the first fluid conduit segment; and a compressor stage disabler drivingly engaged with at least one of the low pressure compressor stages and configured to reduce a rotation thereof.

11. The low pressure compressor section as defined in claim 10, wherein the compressor stage disabler is a brake engageable with the at least one of the low pressure compressor stages to stop a rotation of the at least one of the low pressure compressor stages.

\* \* \* \* \*